(12) United States Patent
Hammann (10) Patent No.: US 9,579,749 B2
(45) Date of Patent: Feb. 28, 2017

(54) METHOD FOR PROCESSING A WORKPIECE AND PROCESSING DEVICE

(71) Applicant: TRUMPF Werkzeugmaschinen GmbH + Co. KG, Ditzingen (DE)

(72) Inventor: Gerhard Hammann, Korntal-Muenchingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 353 days.

(21) Appl. No.: 14/149,962

(22) Filed: Jan. 8, 2014

(65) Prior Publication Data

US 2014/0138363 A1 May 22, 2014

Related U.S. Application Data (63) Continuation of application No. PCT/EP2012/063364, filed on Jul. 9, 2012.

(30) Foreign Application Priority Data

Jul. 13, 2011 (DE) .................. 10 2011 079 083

(51) Int. Cl.
*B23K 26/02* (2014.01)
*B23K 26/08* (2014.01)
(Continued)

(52) U.S. Cl.
CPC ............ *B23K 26/04* (2013.01); *B23K 26/03* (2013.01); *B23K 26/048* (2013.01); *B23K 26/38* (2013.01)

(58) Field of Classification Search
CPC ..... B23K 26/02; B23K 26/03–26/0344; B23K 26/035; B23K 26/04–26/046; B23K 26/048; B23K 26/38
(Continued)

(56) References Cited

U.S. PATENT DOCUMENTS

| 4,986,664 A * | 1/1991 | Lovoi .................. B23K 26/032 219/121.62 |
| 5,006,999 A * | 4/1991 | Kuno .................. G05B 19/425 219/124.34 |

(Continued)

FOREIGN PATENT DOCUMENTS

| CN | 201720604 U | 1/2011 |
| DE | 102007059481 A1 | 6/2009 |

(Continued)

OTHER PUBLICATIONS

Notification of Transmittal of Translation of the International Preliminary Report on Patentability and Written Opinion for corresponding PCT Application No. PCT/EP2012/063364, mailed Jan. 23, 2014, 8 pages.

(Continued)

*Primary Examiner* — Sang Y Paik
(74) *Attorney, Agent, or Firm* — Fish & Richardson P.C.

(57) ABSTRACT

A method for processing a workpiece with a processing device which has a processing head which can be moved at a defined speed and distance from a surface of the workpiece, the method comprising at least partially detecting a surface topography of the workpiece to be processed, determining a minimum desired operating distance of the processing head from the workpiece with reference to the detected surface topography of the workpiece and a trailing spacing of the processing head associated with the defined speed, and processing the workpiece with the processing head at the established minimum desired operating distance of the processing head from the workpiece.

15 Claims, 3 Drawing Sheets

(51) Int. Cl.
*B23K 26/04* (2014.01)
*B23K 26/38* (2014.01)
*B23K 26/03* (2006.01)

(58) Field of Classification Search
USPC .......................................... 219/121.6–121.86
See application file for complete search history.

(56) References Cited

U.S. PATENT DOCUMENTS

| | | | | |
|---|---|---|---|---|
| 5,061,839 | A * | 10/1991 | Matsuno | B23K 26/1476 219/121.75 |
| 5,067,086 | A * | 11/1991 | Yamazaki | B23K 26/046 219/121.79 |
| 6,563,130 | B2 | 5/2003 | Dworkowski | |
| 2004/0104207 | A1 | 6/2004 | Wu et al. | |
| 2011/0048254 | A1* | 3/2011 | Espe | B23K 26/0084 100/35 |

FOREIGN PATENT DOCUMENTS

| | | |
|---|---|---|
| DE | 102009003504 A1 | 8/2010 |
| EP | 0490146 A2 | 6/1992 |
| EP | 1716960 B1 | 11/2006 |
| JP | 2001038550 A | 2/2001 |
| JP | 2010279978 A | 12/2010 |
| WO | WO0187534 A2 | 11/2001 |

OTHER PUBLICATIONS

International Search Report for corresponding PCT Application No. PCT/EP2012/063364, mailed Oct. 17, 2012, 4 pages.

* cited by examiner

METHOD FOR PROCESSING A WORKPIECE AND PROCESSING DEVICE

CROSS REFERENCE TO RELATED APPLICATION

This application is a continuation of and claims priority under 35 U.S.C. §120 to PCT/EP2012/063364, filed on Jul. 9, 2012, which claims priority under 35 U.S.C. §119 to German Application No. 10 2011 079 083.7, filed on Jul. 13, 2011. The contents of the prior applications are hereby incorporated by reference in their entirety.

TECHNICAL FIELD

The invention relates to a method and a processing device for processing a workpiece.

BACKGROUND

In current processing devices, to process a workpiece the operating spacing between a processing head and a workpiece is in most cases continually monitored and controlled with respect to a fixedly predetermined desired operating spacing. To this end, the processing head is moved during the processing operation towards the workpiece or away from the workpiece along at least one of the movement axes thereof.

For an optimum processing result on the workpiece, the smallest possible operating spacing of the processing head from the workpiece is often desired. This is particularly the case during thermal separation cutting operations or also in many welding applications. In such processing operations, sometimes costly process fluids (e.g., inert or active gases) are often used, the consumption of which increases as the operating spacing of the processing head from the workpieces to be processed increases.

In practice, the workpieces to be processed often have a surface which is not planar over the entire surface. For instance, in metal sheets there are occurrences of surface undulation which may originate, for example, from a previous production process of the metal sheets or also the arrangement thereof in a tool receiving member of the processing device used. Furthermore, the metal sheets may be thermally deformed by the processing operation. The metal sheets may also be arranged in an oblique manner with the surface thereof in the workpiece receiving member with respect to a movement axis of the processing head.

In industrial mass production, the processing head for processing the workpiece must be moved at high speed over the workpiece for reasons of economy. In this respect, the processing head during such applications cannot readily be moved with respect to the workpiece with a small operating spacing of, for example, 0.3 mm from the workpiece. The processing head, even with highly dynamically configured systems has a deviation of the actual position thereof from the desired position thereof in accordance with the respective movement speed, that is to say, a so-called trailing spacing, along the movement axes thereof. Taking into account the variable surface topography of the workpieces in the case of an excessively small desired operating spacing of the processing head from the workpiece, collisions of the processing head with the workpiece may occur. In addition to the resulting undesirable interruptions to the process, this may lead to damage of the processing head (for example, the focusing lens of a laser processing head) or the workpiece. This is disadvantageous for the processing result and the efficiency of the method.

SUMMARY

An advantage of certain aspects of the invention is to provide a method and a processing device which enable reliable processing of a workpiece in a robust manner with respect to process interruptions, with the smallest possible operating spacing or distance of the processing head from the workpiece.

An advantage connected with certain methods described herein involves the processing of the workpiece being able to be carried out at a predetermined movement speed of the processing head with respect to the workpiece (processing speed) with a minimum desired operating spacing of the processing head from the workpiece with respect to the actual surface topography of the workpiece. The danger of a collision of the processing head with the workpiece can at the same time is thereby generally reduced and the processing result (e.g., during splitting or welding operations) can be improved with respect to an operating spacing which is selected to be excessively large. At the same time, when a process fluid is used, a (high) consumption of the process fluid involved with an unnecessarily large spacing can be reduced. In practice, the actual position of the processing head along the predetermined desired processing path thereof lags behind the desired position of the processing head on the desired processing path in each case, the desired position being predetermined at the control side. The respective difference of the actual position value of the processing head from the desired position value is referred to as trailing spacing. The trailing spacing is dependent on the speed of the movement of the processing head along the movement axes thereof and the so-called speed increase KV of the processing device. The speed increase KV is the significant (linear) characteristic value for the behavior of the control circuit for controlling the movement of the processing head along the movement axes thereof. This characteristic value sets out the ratio of the actual speed of the processing head with respect to the trailing spacing and is consequently a measurement for the accuracy of the imaging of the processing device when the processing head is moved along curves in a plane or in space. The electromechanical drive systems of current processing devices have in this regard conventional speed increases of between 10 and $80 \cdot s^{-1}$ in highly dynamic processing devices and sometimes up to over $150 \cdot s^{-1}$. The respective trailing spacing of the processing head is known for the movement speeds of the processing head in current processing devices, which speeds are used for processing the workpiece, and is continuously monitored during the processing operation.

With regard to some aspects of the invention, the surface topography of the workpiece can be detected before or during the processing of the workpiece. In the first instance mentioned, this may be carried out by determining the position of defined measurement locations (reference locations) of the workpiece surface with respect to an operating coordinate system of the processing device defined by main movement axes (X, Y, Z axes) of the processing head. Time-consuming detection of the surface topography of the entire workpiece involving complex calculations can thereby be prevented.

The detection of the surface topography of the workpiece during the workpiece processing operation affords time advantages in this regard since the workpiece can be processed without delay.

In some embodiments, the surface topography of the workpiece can be detected in a contact-free manner, (e.g., in an optical or capacitive manner) or in a tactile manner.

To detect the surface topography of the workpiece during the workpiece processing operation the workpiece is first processed with a preliminary desired operating spacing of the processing head from the workpiece being predetermined. The preliminary desired operating spacing is in this instance typically sized in a conservative (that is to say, generous) manner to prevent an unnecessary collision of the processing head with the workpiece. Such collisions are in practice more serious than uneconomical operation of the processing device at the beginning of the processing operation, for example, owing to an unnecessarily high consumption of a process fluid.

Using the methods described herein, the surface topography of the workpiece is detected during the processing of the workpiece in a surface detection region which is arranged at least partially upstream of a respective processing location on the workpiece in the movement direction of the processing head along a desired processing path predetermined at the control side. The surface detection region in this instance can be moved in a synchronized manner relative to the processing head along a predetermined desired processing path of the processing head with respect to the workpiece. The surface topography of the workpiece is consequently dynamically detected in a surface region which is upstream of the processing location or processing region of the workpiece. A sensor system which is used in this instance may at least have a sensor which is arranged directly on the processing head of the processing device and which typically operates in a capacitive or optical manner, or it is moved by an independent mimic system along the desired processing path.

Using the methods described herein, to determine the surface topography of the workpiece, control signals for adjusting the respective operating spacing of the processing head from the workpiece to the predetermined preliminary desired operating spacing or the spacing adjustment movements of the processing head itself are detected. The spacing adjustment or the spacing adjustment movements of the processing head are carried out in accordance with the respective surface topography of the workpiece along the predetermined desired processing path. Since the control signals from a control unit for controlling the spacing adjustment movements of the processing head are present in any case, they can readily be used to determine the surface topography.

During the processing operation, the movements of the processing head along the processing axes thereof are generally detected in the processing devices which are commercially available. To this end, position sensors are often used for time-resolved determination of the respective position of the processing head along the movement axes thereof. From the data received, paths travelled by the processing head and acceleration values during the spacing adjustment movements can be readily established. From these data, the surface topography can be determined without additional sensors. The method can thereby also be readily subsequently implemented in existing processing devices.

The speed-dependent trailing spacing can be established (experimentally) for the respective movement speed of the processing head along the movement axes thereof before processing the workpiece, and stored in the control device. This may be carried out, for example, as a characteristic line, as a characteristic field for a plurality of relevant movement speeds or also in the form of a mathematical function. The trailing spacing can further be determined with reference to the movements of the processing head along the movement axes thereof only when the workpiece is processed.

It should be noted that the predetermined minimum operating spacing can be determined on the basis of a surface region of the workpiece which may not be representative of all the workpiece regions to be processed if the surface topography of the workpiece is not detected along the entire desired processing path of the processing head and is at least periodically used to determine a (respective) minimum desired processing spacing. A risk which remains in this regard of collision of the processing head with the workpiece can thereby be further reduced by the minimum desired operating spacing being established with a defined safety allowance. The safety allowance is sized in terms of its magnitude typically in accordance with the previously determined surface topography and/or the previously determined trailing spacing of the processing head.

In some embodiments, the predetermined minimum desired operating spacing is also used to adjust additional operating parameters of the processing device. For instance, a power of a generator used to generate a welding current used during a welding operation or generate a laser beam, a focal point of the laser beam and/or a flow rate of a process fluid can be controlled and/or adjusted in accordance with the predetermined minimum desired operating spacing of the processing head from the workpiece. On the whole, this is advantageous for the efficiency of the processing operation and the processing result.

The method proposed is also suitable for processing operations in which a processing head which operates in a contact-free manner is used, e.g., for thermal separation and welding processes in which a process fluid, such as an inert gas (protective gas), an active gas or a mixture of the mentioned gases is used.

The processing device for processing a workpiece has a processing head which can be moved at a defined speed with spacing from a workpiece to be processed.

The processing device has a sensor system for detecting a surface topography of the workpiece and a control unit by which the movement of the processing head with respect to the workpiece can be controlled or adjusted. The control unit is programmed in this instance to carry out the method described above.

The details of one or more embodiments of the invention are set forth in the accompanying drawings and the description below. Other aspects, features, objects, and advantages of the invention will be apparent from the description and drawings, and from the claims.

The invention is explained in greater detail below with reference to two embodiments set out in the drawings. The embodiments shown and described are not intended to be understood to be a definitive listing, but are instead of an exemplary nature to describe the invention. The figures show the subject-matter in a highly schematic manner and are not intended to be understood to be drawn to scale.

Like reference symbols in the various drawings indicate like elements.

DETAILED DESCRIPTION

Figure 1:
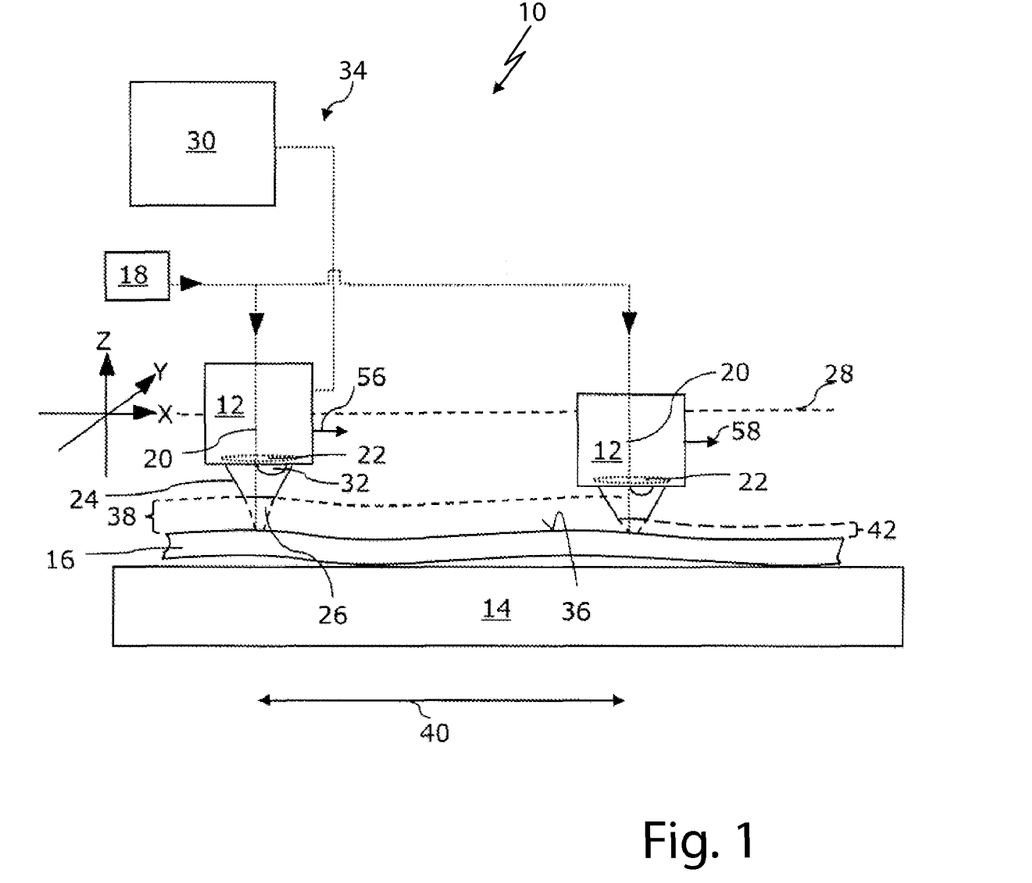
FIG. 1 is a side view of a laser processing device having a processing head, which can be moved with defined spacing with respect to the workpiece to process a workpiece, and which has a sensor system having a spacing sensor for detecting a surface topography of the workpiece.

FIG. 1 shows a processing device 10 which is a laser processing device and which has a processing head 12 which can be moved over a workpiece 16 and is shown at two different times and positions with respect to the workpiece 16. The workpiece 16 is arranged on a workpiece retention member 14 (in this instance a metal sheet) with spacing along three main movement axes X, Y, Z.

A laser beam source 18 produces a laser beam 20 which is intended for thermal separation cutting of the workpiece 16. The laser beam 20 can be guided over the workpiece 16 by the processing head 12. A focusing lens 22 which is arranged in the processing head 12 focuses the laser beam 20 on the workpiece 16. On the processing head 12 is a nozzle 24 via which a process fluid 26, in this instance an inert gas, can be guided towards the workpiece 16. The process fluid 26 protects the focusing lens 22 from damage resulting from melt particles which occur during the processing of the workpiece 16 (e.g., the melt discharge during thermal fusion cutting) and which are not illustrated in greater detail in FIG. 1.

A control unit 30 serves to control and adjust the movements of the processing head 12 along a predetermined desired processing path 28. The control unit 30 is coupled to a spacing sensor 32 which operates in a capacitive manner and which is arranged on the processing head 12. An adjustment of a respective operating spacing of the processing head 12 to a desired operating spacing which is predetermined at the control side is thereby enabled. The control unit 30 forms, together with the spacing sensor 32, a sensor system 34 by which a surface topography of the workpiece 16 can be detected, as will be described in greater detail below. The control unit 30 further controls or adjusts other operating parameters of the processing device 10, e.g., a respective quantity flow of the process fluid 26 which is discharged from the nozzle 24 and a power output of the laser beam source 18.

FIG. 1 shows the processing head 12 during processing of the workpiece 16 at two different times. At the left-hand side in the drawings, the processing head 12 is shown during partial detection of the surface topography, that is to say, the geometric form and position of the surface 36 of the workpiece 16 with respect to the movement axes X, Y, Z of the processing head 12. A preliminary desired operating spacing predetermined for this operating mode at the control side is designated 38.

At the right-hand side in FIG. 1, the processing head 12 is shown at a processing time at which the surface topography of the workpiece 16 has been partially detected, that is to say, in this instance over a path 40 along the X movement axis of the processing head 12. The operating spacing of the processing head 12, after determining a minimum desired operating spacing 42 for the further processing of the workpiece 16, is adjusted to this minimum desired operating spacing 42.

Figure 2:
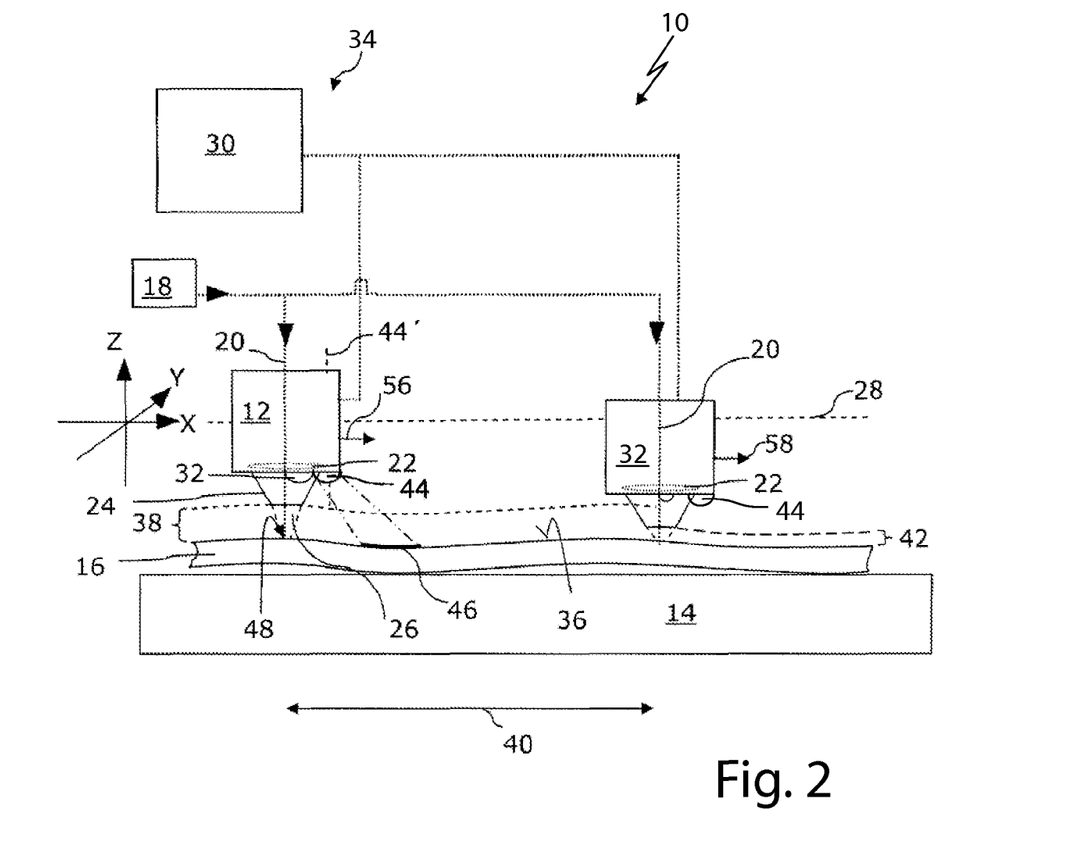
FIG. 2 is a side view of a laser processing device similar to FIG. 1 having a processing head which has a sensor system having an optical sensor whose surface detection region is arranged at least partially upstream of a respective processing location on the workpiece in the movement direction of the processing head.

FIG. 2 shows another embodiment of a processing device 10' which differs from the processing device explained above in that, in addition to the spacing sensor 32 for detecting a respective operating spacing of the processing head 12 from the workpiece 16, it has an optical sensor 44. The optical sensor 44 is arranged on the processing head and can be rotated with respect thereto about a rotation axis 44'. The optical sensor serves to detect in advance the surface topography of the workpiece 12 in relation to the movement axes X, Y, Z of the processing head 12. A workpiece-side surface detection region 46 of the sensor 44 can be orientated by correspondingly controlled rotation (controlled by the control unit 30) of the sensor 44 with respect to the processing head 12 and with respect to a respective movement direction of the processing head 12 along the predetermined desired processing path 28. The surface detection region 46 can thereby be at least partially positioned upstream of a respective processing location 48 on the workpiece 16. The optical sensor 44 and consequently the surface detection region 46 thereof can be moved in a synchronized manner together with the processing head 12 along the desired processing path 28 with respect to the workpiece 16.

Figure 3:
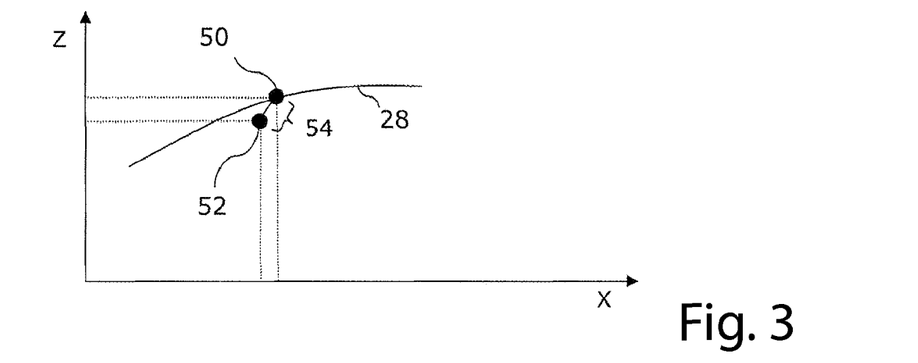
FIG. 3 is a plan view of the desired processing path from FIG. 2 with respect to movement axes of the processing head, the processing head having an actual position which differs from the desired position.

FIG. 3 shows an exemplary graph of the desired processing path 28 with respect to the movement axes X, Z of the processing head. A desired position of the processing head on the desired processing path 28 is designated 50. The actual position 52 of the processing head has, during the processing of the workpiece, a speed-dependent trailing spacing 54 with respect to the desired position thereof on the desired processing path 28. The trailing spacing of the processing head can, for the defined speed at which the processing head is moved along the desired processing path with respect to the workpiece when the workpiece is processed, or also for a plurality of movement speeds of the processing head which can be selected for processing the workpiece, be recorded or stored in the control unit. This may be carried out in the form of a characteristic line, a characteristic field or also a mathematical function. The trailing spacing 54, as set out below, is taken into account for the workpiece when determining the minimum desired operating spacing 42 of the processing head from the workpiece.

Figure 4:
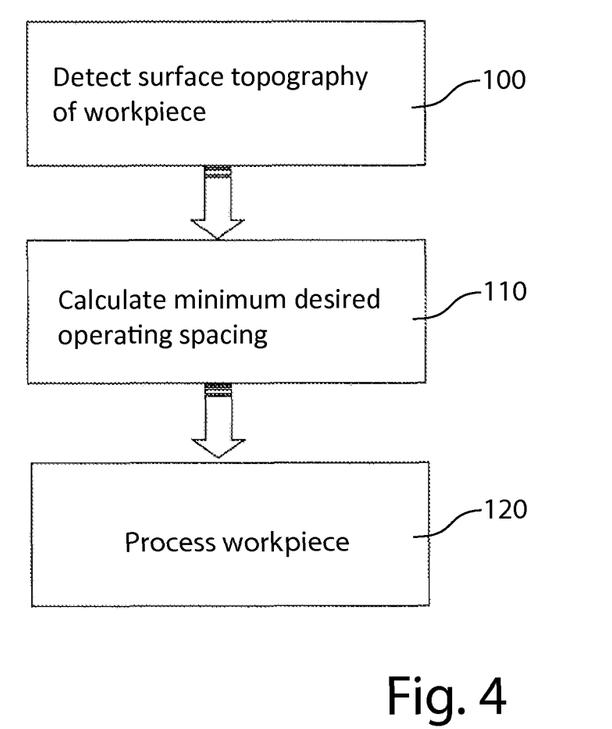
FIG. 4 is a flow chart with the individual steps of the method for processing a workpiece.

The method for processing the workpiece is explained below with additional reference to FIG. 4. To process the workpiece 16 with an operating spacing of the processing head 12 from the workpiece 16 that is optimum in terms of operation for a selected movement speed of the processing head 12 along the desired processing path 28, the surface topography of the workpiece 16 is detected in a first operating step 100. To this end, the workpiece 16 is processed with the laser beam 20 with a preliminary desired operating spacing 38 of the processing head 12 with respect to the workpiece 16 being predetermined. The preliminary desired operating spacing 38 can be selected in a conservative manner, that is to say, have a value which is sized sufficiently generously (e.g., from 1 to 1.5 mm) to reliably prevent collisions of the processing head 12 with the workpiece 16. During this detection step, the processing head 12 is moved with respect to the workpiece 16 at the defined speed along the desired processing path 28 predetermined at the control side in the direction of the arrow 56 (shown in FIG. 2). In this instance, a respective operating spacing of the processing head 12 from the workpiece 16 is detected by the spacing sensor 32 and adjusted by the control unit 30 to the preliminary desired operating spacing 38. At the same time, respective axial positions of the processing head 12 along the movement axes X, Y, Z thereof are detected by the control unit 30 in a time-resolved manner.

In a subsequent operating step 110, the minimum desired operating spacing 42 of the processing head 12 from the workpiece 16 is calculated with reference to the previously detected surface topography of the workpiece 16 and the associated trailing spacing 54 of the processing head for the selected movement speed (processing speed). In this instance, a predetermined safety allowance of 0.05 mm in this instance is taken into account. The safety allowance may also be smaller or larger.

In another operating step 120, the workpiece 16 is (further) processed with the determined minimum desired operating spacing 42 along the predetermined desired processing path 28 in the direction of the arrow 58 being predetermined.

Depending on the minimum desired operating spacing 42, other operating parameters of the processing device 10, 10' can be controlled such as a power output of the laser beam source 18, a focal point of the laser beam 20 with respect to the workpiece 16 and a pressure and consequently indirectly a quantity flow of the process fluid 26 discharged from the nozzle 24.

Of course, in the case of the processing device 10' shown in FIG. 2, the surface topography of the workpiece 16 can be established by the control unit 30 with reference to the measurement data generated by the optical sensor 44 and can be used to determine the minimum desired operating spacing 38 of the processing head 12 from the workpiece 16.

A number of embodiments of the invention have been described. Nevertheless, it will be understood that various modifications may be made without departing from the spirit and scope of the invention. Accordingly, other embodiments are within the scope of the following claims.

The invention claimed is:

1. A method for processing a workpiece with a processing device that has a processing head that can be moved at a defined speed and distance from a surface of the workpiece, the method comprising:
    at least partially detecting a surface topography of the workpiece to be processed;
    subsequently determining a minimum desired operating distance of the processing head from the workpiece with reference to the detected surface topography of the workpiece and determining a trailing spacing of the processing head associated with the defined speed, wherein the minimum desired operating distance is determined with a defined safety allowance sufficient to reliably prevent collisions of the processing head with the workpiece, and wherein additional operating parameters of the processing device are adjusted in accordance with the determined minimum desired operating distance; and
    processing the workpiece with the processing head at the determined minimum desired operating distance of the processing head from the workpiece.

2. The method according to claim 1, wherein the surface topography of the workpiece to be processed is detected in a contact-free manner.

3. The method according to claim 1, wherein the surface topography of the workpiece to be processed is detected in a tactile manner.

4. The method according to claim 1, comprising scanning the workpiece at a preliminary desired operating distance of the processing head from the workpiece with a sensor system to detect the surface topography of the workpiece in a surface detection region which is arranged at least partially upstream of a respective processing location on the workpiece in a movement direction of the processing head along a predetermined desired operating path.

5. The method according to claim 4, wherein at least partially detecting a surface topography of the workpiece comprises moving the surface detection region simultaneously with the processing head along the desired processing path.

6. The method according to claim 1, wherein at least partially detecting a surface topography of the workpiece comprises
    scanning the workpiece at a preliminary desired operating distance of the processing head from the workpiece, and
    adjusting a respective operating distance of the processing head from the workpiece to the preliminary desired operating distance with reference to control signals or with reference to distance adjustment movements of the processing head with respect to the workpiece.

7. The method according to claim 6, wherein the distance adjustment movements are calculated by determining acceleration values of the processing head and/or paths of the processing head travelled along at least one movement axis.

8. The method according to claim 1, wherein the trailing spacing of the processing head is determined before the workpiece is processed.

9. The method according to claim 1, wherein the trailing spacing of the processing head is established during the processing of the workpiece.

10. The method according to claim 1, wherein the safety allowance is sized in accordance with the previously detected surface topography of the workpiece and/or the previously established trailing spacing of the processing head.

11. The method according to claim 1, wherein the predetermined minimum desired distance is used to adjust operating parameters of the processing device.

12. A processing device for processing a workpiece having a processing head that can be moved at a defined speed and distance from a workpiece to be processed, comprising:
    a sensor system for detecting a surface topography of the workpiece; and
    a control unit for controlling the movement of the processing head with respect to the workpiece, wherein the control device is programmed to:
        move the processing head at a defined speed and distance from a surface of the workpiece,
        at least partially detect a surface topography of the workpiece,
        subsequently determine a minimum desired operating distance of the processing head from the workpiece with reference to the previously detected surface topography of the workpiece and determine a trailing spacing of the processing head associated with the defined speed, wherein the minimum desired operating distance is determined with a defined safety allowance sufficient to reliably prevent collisions of the processing head with the workpiece, and wherein additional operating parameters of the processing device are adjusted in accordance with the determined minimum desired operating distance, and process the workpiece with the processing head at the determined minimum desired operating distance of the processing head from the workpiece.

13. The processing device according to claim 12, wherein the sensor system has a spacing sensor for measuring an operating distance of the processing head from the workpiece.

14. The processing device according to claim 12, wherein the processing head has a nozzle for a process fluid.

15. The processing device according to claims 12, wherein the processing device is a laser processing device.

* * * * *

UNITED STATES PATENT AND TRADEMARK OFFICE
CERTIFICATE OF CORRECTION

PATENT NO. : 9,579,749 B2  
APPLICATION NO. : 14/149962  
DATED : February 28, 2017  
INVENTOR(S) : Gerhard Hammann Page 1 of 1

It is certified that error appears in the above-identified patent and that said Letters Patent is hereby corrected as shown below:

On the Title Page

Column 1
(Title), Lines 1-2 (Approx.), delete "METHOD FOR PROCESSING A WORKPIECE AND PROCESSING DEVICE" and insert -- PROCESSING DEVICE AND METHOD FOR PROCESSING A WORKPIECE --

In the Specification

Column 1
Lines 1-2 (Approx.), delete "METHOD FOR PROCESSING A WORKPIECE AND PROCESSING DEVICE" and insert -- PROCESSING DEVICE AND METHOD FOR PROCESSING A WORKPIECE --

In the Claims

Column 9
Line 10, in Claim 15, delete "claims" and insert -- claim --

Signed and Sealed this  
Second Day of June, 2020

Andrei Iancu  
*Director of the United States Patent and Trademark Office*